(12) United States Patent
Harjanto

(10) Patent No.: US 7,058,956 B1
(45) Date of Patent: Jun. 6, 2006

(54) DIRECTORY SERVICES INTERFACE EXTENSIONS WITH AGGREGATABLE SOFTWARE OBJECTS

(75) Inventor: Andy Harjanto, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/387,927

(22) Filed: Sep. 1, 1999

(51) Int. Cl.
*G06F 9/44* (2006.01)

(52) U.S. Cl. ........................................ 719/316; 717/116

(58) Field of Classification Search ................ 719/315, 719/316, 318; 709/203, 217, 226; 707/103 R, 707/10, 200; 717/100, 116, 107, 108
See application file for complete search history.

(56) References Cited

U.S. PATENT DOCUMENTS

| 5,736,983 | A | * | 4/1998 | Nakajima et al. | ........... 715/762 |
| 5,778,227 | A | * | 7/1998 | Jordan | ................... 707/103 R |
| 5,805,885 | A | * | 9/1998 | Leach et al. | ................ 719/316 |
| 5,893,107 | A | * | 4/1999 | Chan et al. | ............. 707/103 R |
| 5,978,579 | A | * | 11/1999 | Buxton et al. | ............... 717/107 |
| 6,052,724 | A | * | 4/2000 | Willie et al. | ................ 709/223 |
| 6,061,743 | A | * | 5/2000 | Thatcher et al. | ............ 719/328 |
| 6,108,661 | A | * | 8/2000 | Caron et al. | ................ 707/102 |
| 6,195,791 | B1 | * | 2/2001 | Carlson et al. | ............ 717/100 |
| 6,208,994 | B1 | * | 3/2001 | Abdelnur | ................ 707/103 R |
| 6,360,230 | B1 | * | 3/2002 | Chan et al. | ............. 707/103 R |
| 6,449,659 | B1 | * | 9/2002 | Caron et al. | ................ 719/315 |
| 6,498,612 | B1 | * | 12/2002 | Brown et al. | ............... 715/762 |
| 6,513,157 | B1 | * | 1/2003 | Glass | ......................... 717/165 |
| 6,694,378 | B1 | * | 2/2004 | Lortz | ......................... 719/321 |
| 2002/0156758 | A1 | * | 10/2002 | Cote et al. | ..................... 707/1 |

OTHER PUBLICATIONS

MSDN article: "Lowering Total Cost of Ownership with Active Directory-Enabled Applications", Jul. 1998 http://msdn.microsoft.com/library/default.asp?url=/library/en-us/dnactdir/html/msdn_deavision.asp.*

Thompson, Nigel: "MFC/COM Objects 4: Aggregation", Mar. 20, 1995. http://msdn.microsoft.com/library/default.asp?url=/library/en-us/dncomg/html/msdn_house4.asp.*

Microsoft Whitepaper: "Microsoft Active Directory Services Interfaces: ADSI Open Interfaces for Managing and Using Directory Services", 1998.*

OLE 2 Programmer's Reference, vol. 1, Working with Windows Objects,, Microsoft Press, 1994, pp. 36-39.*

* cited by examiner

*Primary Examiner*—William Thomson
*Assistant Examiner*—George L. Opie
(74) *Attorney, Agent, or Firm*—Woodcock Washburn LLP (57) ABSTRACT

Extensions for directory service interfaces are disclosed. In one embodiment, a system includes a directory, one or more directory services for the directory, and a directory services interface that provides a common abstract interface to each of the directory services. Furthermore, a directory services interface extension of the system provides the directory services interface with an extended functionality.

12 Claims, 5 Drawing Sheets

DIRECTORY SERVICES INTERFACE EXTENSIONS WITH AGGREGATABLE SOFTWARE OBJECTS

FIELD OF THE INVENTION

This invention relates generally to directory services interfaces, and more particularly to extensions for such interfaces.

BACKGROUND OF THE INVENTION

One challenge of working within a large, distribution computing environment is identifying and locating resources such as users, groups, print queues, documents, etc. A directory service is part of a distributed computing environment that provides a way to locate and identify the users and resources available in the system. A directory service is like a phone directory. Given a name for a person or a resource, it provides the information necessary to access that person or resource. A user does not have to use specific information to access the resource on the network.

However, most enterprises have many different directories in place. For example, network operating systems, electronic mail systems, and applications known as "groupware" applications all have their own directories. Network resource directories include Microsoft Active Directory, Lightweight Directory Access Protocol (LDAP)-based directories, Distributed Component Environment (DCE) cell directory services, Banyan StreetTalk, and Novel Directory Services. Application-specific directories include those associated with Lotus Notes, cc:Mail, and Microsoft Exchange.

Thus, issues arise when a single enterprise deploys multiple directories. These issues include usability, data consistency, development cost, and support cost, among other issues. End users face multiple logons and a variety of interfaces to information across multiple directories. Administrators face the complexity of managing multiple directories. Developers face an additional dilemma: which directory service to use. Each directory offers unique application interfaces. Developers must choose a specific directory implementation, or support multiple versions of their application. As a result, developers seldom use existing directory services. Directory service interfaces address these issues by providing a single, consistent, open set of interfaces for managing and using multiple directories. Directory service interfaces make it easier for developers to build applications that register with, access, and manage multiple directory services, with a single set of well-defined interfaces. Directory service interfaces abstract the capabilities of directory services from different network providers to present a single set of directory service interfaces for managing network resources. Thus, administrators and developers can use such interfaces to enumerate and manage the resources in a directory service, no matter which network environment contains the resource.

Directory service interfaces therefore make it easier to perform common administrative tasks, such as adding new users, managing printers, and locating resources throughout the distributed computing environment. Furthermore, directory service interfaces make it easier for developers to "directory enable" their applications. Administrators and developers deal with a single set of directory service interfaces, regardless of the installed directory service or services.

A disadvantage to directory service interfaces found in the prior art, however, is that they have a preset and somewhat limited functionality. That is, the interfaces themselves are predefined. Developers cannot add other interfaces to the directory service interfaces. These means that the developer cannot add functionality that he or she might wish to develop and add to or integrate with the directory service interfaces. This acts as a limitation on directory service interfaces, and for this and other reasons, there is a need for the present invention.

SUMMARY OF THE INVENTION

The invention relates to extensions for directory service interfaces. In one embodiment, a system includes a directory, one or more directory services for the directory, and a directory services interface that provides a common abstract interface to each of the directory services. Furthermore, a directory services interface extension provides the directory services interface with an extended functionality.

The extended functionality provided by the directory services interface extension allows a developer, for example, to add to the predefined interfaces offered by the directory services interface. This means that custom interfaces can be developed for unique situations that are being addressed by the developer. Directory services interface extensions saves time during the development process, by leveraging the functionality that already exists in the directory services interface. The extension gains access to the directory services interface infrastructure, and is viewed by clients to the directory services interface as an integral part of the interface.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
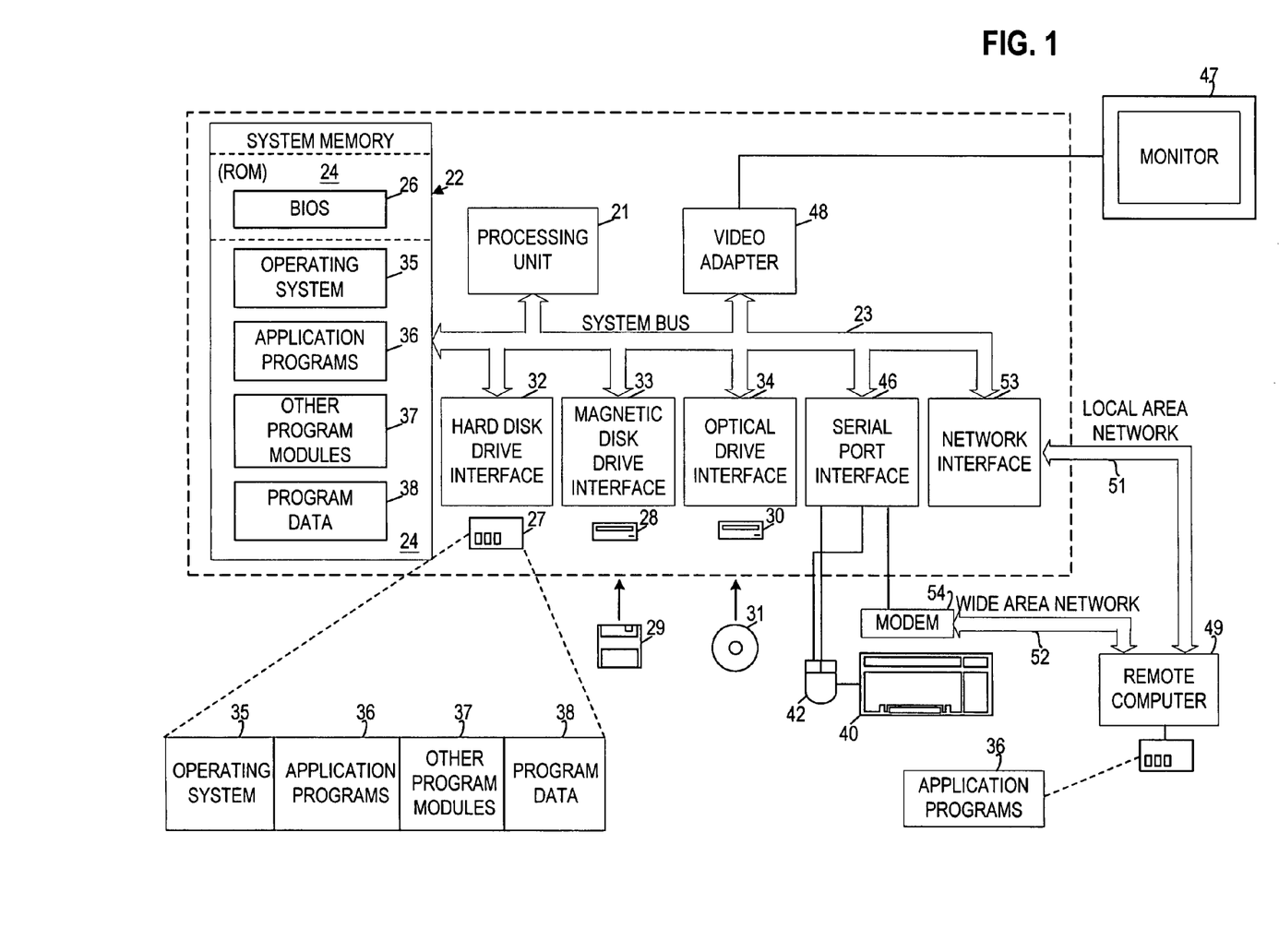
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Figure 2:
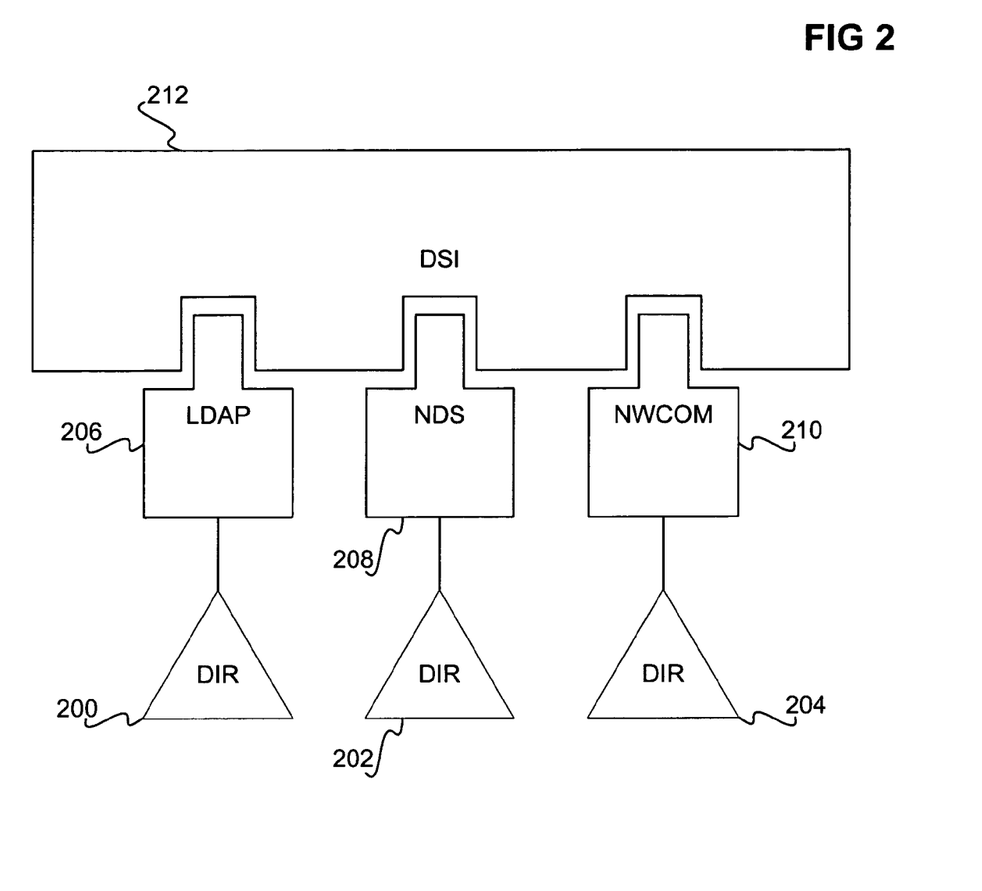
FIG. 2 is a diagram of a directory service interface for a number of directory services and directories.

Directory Services, Directory Services Interfaces and Directory Services Interfaces Extensions In this section of the detailed description, directory services and directory services interfaces, in conjunction with which embodiments of the invention can be practiced, as well as directory services interfaces extensions, according to varying embodiments of the invention, are described. Referring first to FIG. 2, a diagram illustrating a number of directories, directory services, and directory services interfaces is shown. The diagram includes directories 200, 202 and 204, directory services 206, 208 and 210, and directory services interfaces 212.

The directories 200, 202 and 204 are data storing location and other information regarding resources, such as printers, computers, networks, etc., as well as users. The directories can be likened to phone books. The information stored in the directories 200, 202 and 204 allow a user to find out information regarding how to contact or communicate with a desired resource or a user. The invention is not particularly limited to a given type of directory. Furthermore, while three directories are shown in FIG. 2, the invention is not so limited—there may be only one directory, for example, or a number of such directories.

The directory services 206, 208, 210 correspond to the directories 200, 202 and 204, respectively, and provide services for their respective directories. As shown in FIG. 2 common directory services include LDAP, NDS, and Windows NT directory services. However, the invention is not so limited to these directory services. Directory services provide a manner by which information can be accessed (retrieved from) and stored to their respective directories. Each directory service typically has a particular and different manner by which to provide for access to their respective directories. The invention is not limited to a particular number of directory services; furthermore, there can be more than one directory service for a given directory.

Therefore, the directory services interfaces 212 sits on top of the directory services 206, 208 and 210, to abstract the directory services, so as to provide a common (abstract) interface to each of the services. The directory services interfaces can also be referred to as directory services providers. That is, a client can communicate with the directory services not directly therethrough, but rather through the directory services interfaces 212. Thus, rather than having to submit requests in accordance with the particularities of a given directory service, the client instead only has to submit request in accordance with the common interface of the directory services interfaces, regardless of the actual directory service that the interfaces will send the request through. This makes directory access easier and more convenient.

In one embodiment, the directory services interfaces 212 are software objects, such as Component Object Model (COM) objects known within the art, that represent persistent objects of an underlying directory service, such as services 206, 208 and 210. In this embodiment, the objects are manipulated using one or more COM interfaces. The invention is not limited to COM objects, however.

In one embodiment, the directories 200, 202, 204 include the schema. Schema contains definitions of classes and attributes. Class objects define an object class for a given directory. Given an object class and an attribute in the directory, the directory service interface will determine the appropriate interfaces as well as the extension interfaces to be available to the consumers. Class objects can include such objects as country, locality, organization, organizational unit, domain computer, user, group alias, print queue, session, etc.—that is, the kind of data that is stored in the underlying directories. Property objects, also referred to as attribute objects, define properties that are global for all object classes for a given directory service, such as descriptions, givenName (First Name), sn (Last Name), l (Locality), physicalDeliveryOfficeName (Office). Class objects, and attribute objects are each identified by a unique class identifier, or ID.

The interfaces provided by the directory service interfaces 212, for access by clients, are abstractions of the methods that are otherwise provided by class, and attributes of the underlying directory services. Thus, for example, the methods needed to access an attribute, may have counterpart to the methods of the directory services. The methods are abstracted, however, such that they provide a common manner of directory access, regardless of the particular directory service they are used in conjunction with. Common methods include add a new object, delete an object, change information stored in an Directory Service Interfaces object, not in the directory itself, etc.

Figure 3:
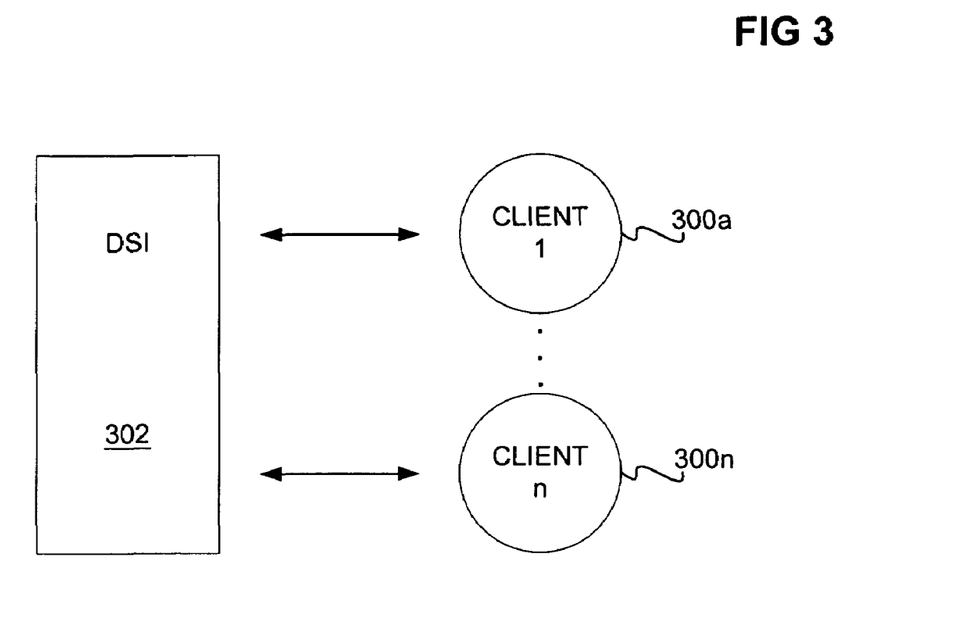
FIG. 3 is a diagram illustrating a client interaction with a directory service interface.

Thus, referring to FIG. 3, clients, such as clients 1 . . . n (referenced as elements 300a through 300n, respectively, in FIG. 3) access all information stored in directories through the directory services interfaces 302. In other words, as shown in FIG. 3, the clients only see the directory services interfaces 302 when accessing directories. They do not see, for example, the actual directories, but the actual directory services that the interfaces 302 abstract.

The distinction between directories and directory service interfaces is as follows. A directory is generally a storage, that is on the server side. The directory usually contains a collection of objects, but does not define methods for those objects. Conversely, directory service interfaces are programmatic interfaces that exist on either clients or servers.

As described in the background section, directory services interfaces do not provide for interfaces (methods) other than standard interfaces, such as add, delete, change information, etc. Embodiments of the invention, conversely, allow for extensions to directory services interfaces to be made, such that additional interfaces—for example, back-up, etc.—to be made. The manner by which such extensions are added to the interfaces is described in subsequent sections of the detailed description.

Figure 4:
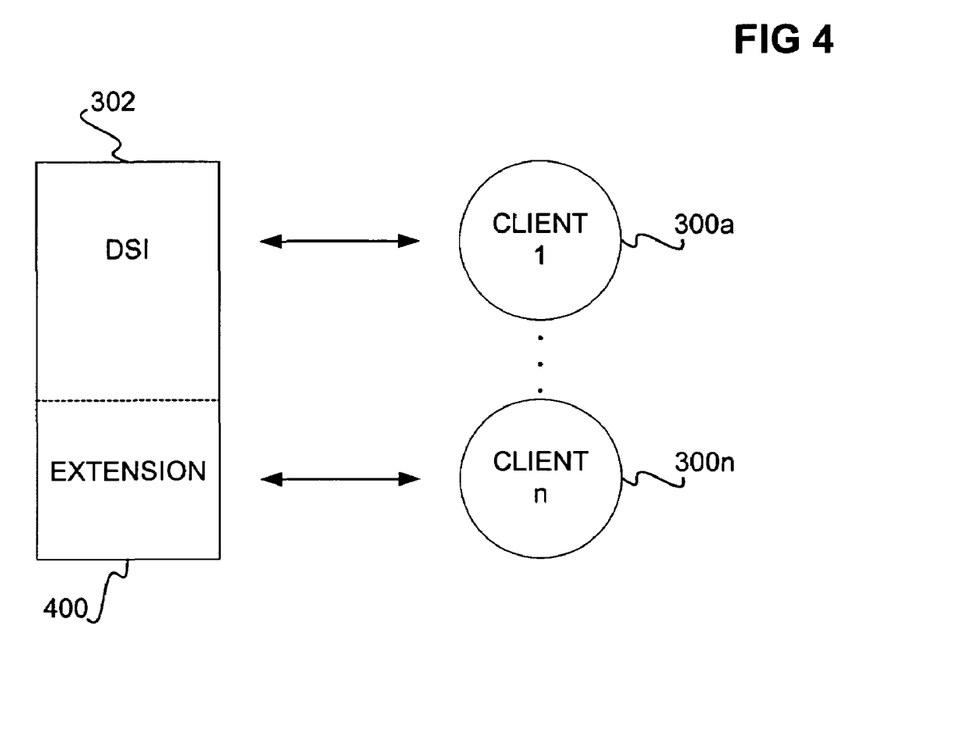
FIG. 4 is a diagram illustrating a client interaction with a directory service interface having a directory service interface extension, according to an embodiment of the invention.

However, referring to FIG. 4, the manner by which clients view such extensions are shown. The extensions 400 ultimately become part of the directory services interfaces 302 themselves, such that the clients 300a through 300n interact with the extensions 400 no differently than as with the interfaces 302. This is a benefit for the clients, since they do not have to change the manner by which they interact with directories, regardless of whether they are using standard methods provided by the interfaces 302, or extension methods provided by the extensions 400. The extensions 400 thus provide the interfaces 302 with an extended functionality that is typically otherwise not provided by the interfaces 302.

Methods

In this section of the detailed description, methods in accordance with varying embodiments of the invention are presented. The methods describe the manner by which an extension is added to directory services interfaces, as well as the manner by which the extension is invoked and utilized. The computer-implemented methods are desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer. The program or programs can be a part of a computer system or a computer, such as that described in conjunction with FIG. 1 in a previous section of the detailed description. The methods described herein are specific to an embodiment of the invention relating to COM; however, the invention itself is not so limited.

Figure 5:
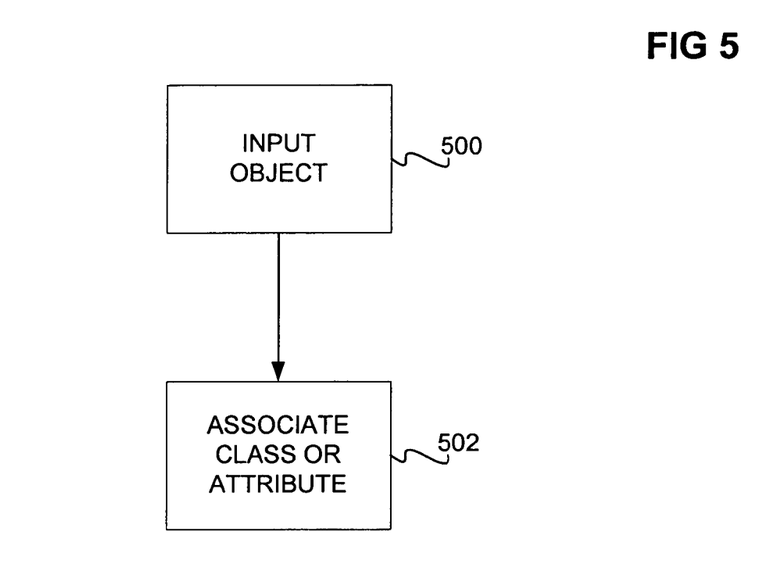
FIGS. 5–6 are flowcharts according to embodiments of the invention.

Referring first to FIG. 5, a flowchart of a method is shown, according to an embodiment of the invention, for adding an extension to a directory services interfaces. An extension itself is first created, which includes creating a software (e.g., COM) object that provides for the functionality desired to be provided by the extension. The object has a class identification, or class ID. Interfaces—that is, exposed methods—of the object are also created and implemented for the object, including providing each interface an interface identification, or interface ID. The interfaces themselves are that which will be added to the directory services interfaces to provide the directory services interface with extended functionality.

Therefore, in 500, a software object is input—for example, as has been created. The software object is consistent with a predetermined software object framework, such as COM. The software object also has a class identification, as has been described, and one or more interfaces, each having an interface ID, as has also been described. The software object is what is known in the art as an aggregatable object. An aggregatable object, for example, in the context of COM, is an object that can be aggregated to another object. Aggregation is a specialized form of containment in the context of COM, for which COM provides special support. Aggregation allows an internal object's interfaces to be exposed as interfaces of an external object.

In 502, a directory class or a directory attribute, as provided by the directory, is associated to the class identification of the aggregatable software object input in 500. This means that the directory class, or the directory attribute, will be extended by the interfaces of the aggregatable software object, as will be described. The association thus aggregates the object to the directory class or directory attribute. The association is stored in a predetermined location. For example, in one embodiment, the association is stored at a location in each client, such as what is known as the Registry in the context of versions of the Microsoft Windows operating system (OS). In another embodiment, the association is stored on the server hosting the directories—for example, within the directories themselves—so that replication among servers easily transfers the association among all the servers, which provides for better security and easier configuration than if stored at the clients.

Thus, the method of FIG. 5 allows for the extension of directory services interfaces with the interfaces of an aggregatable software object, via aggregation in one embodiment. The part of the directory services interfaces that is specifically extended is a particular directory class of objects, or a particular attribute of a particular directory class of objects. In one embodiment, the extensions are hierarchically inherited, as well. For example, if the directory classes themselves are organized in a hierarchical manner, such that a higher class is extended, then the classes subordinate to this higher class are also extended. The invention is not so limited, however.

Figure 6:
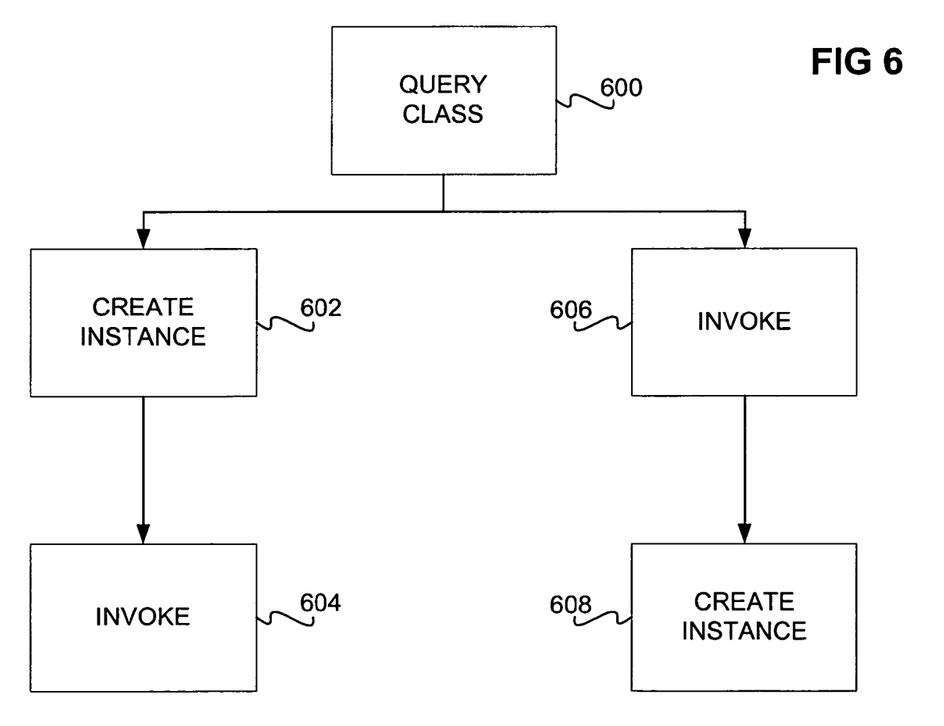

Referring next to FIG. 6, a flowchart of a method for invoking the interfaces of the directory services interfaces, including any extensions added thereto, according to one embodiment of the invention, is shown. In 600, the directory class or the directory attribute to which the extension has been added pursuant to the method of FIG. 5 is queried, so that the interfaces of the directory class or the directory attribute, including the interfaces of the aggregatable software object providing the extended functionality, are exposed. In the context of COM, for instance, this is accomplished by calling the QueryInterface( ) method, as known within the art.

In one embodiment, an instance of the aggregatable software object providing the functionality is immediately created in 602, upon the querying of the directory class or the directory attribute in 600. This means that the instance is created prior to any of the interfaces of the aggregatable software object are actually invoked, or used, as represented in 604, via the interface ID's of the interfaces. However, in another embodiment, no instance of the aggregatable software object is created until one of the interfaces is invoked in 606, via its interface ID, such that then the instance is created in 608, upon invocation. The embodiment represented by 606 and 608 represents the case of interfaces referred to in the art as tear-off interfaces.

Figure 7:
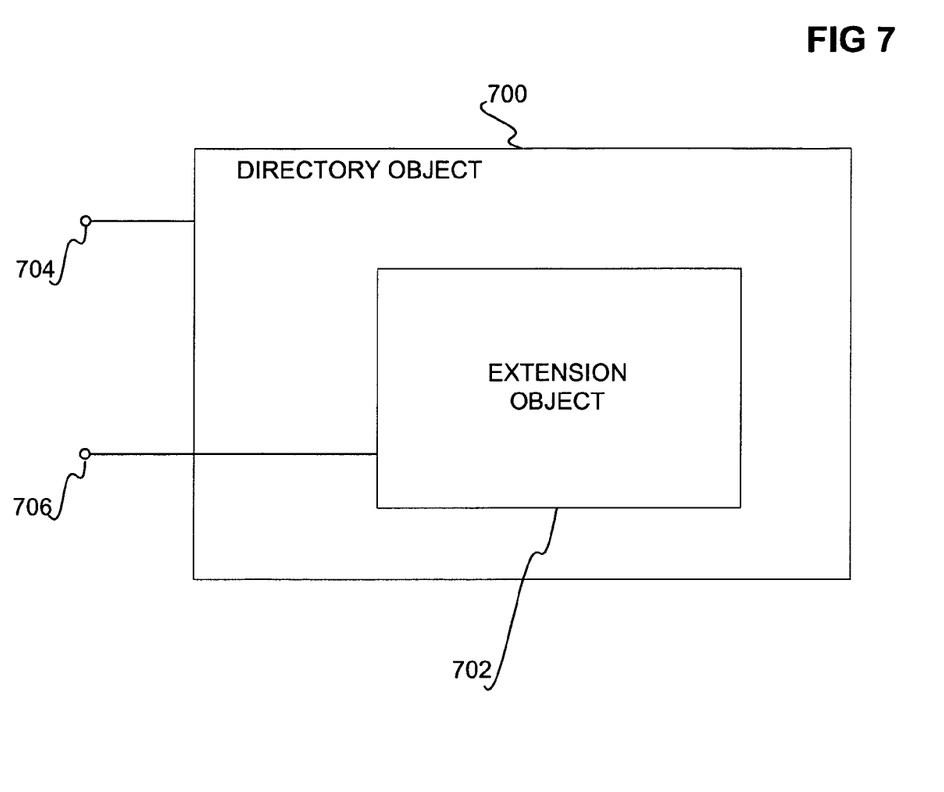
FIG. 7 is a diagram showing an extension object aggregated into a directory object, according to an embodiment of the invention.

Referring finally to FIG. 7, a diagram showing an extension object aggregated into a directory object is shown, to provide for extending the functionality of the directory object with the functionality of the extension object, according to one embodiment of the invention. The directory object 700 has aggregated thereinto the extension object 702. Thus, the interfaces 704 that are normally a part of the object 700 are now extended to include the interfaces 706 of the extension object 702. Thus, to a client of the directory object 700, both the interfaces 704 and the extended interfaces 706 are exposed.

CONCLUSION

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

The invention claimed is:

1. A computer-implemented method comprising:
   generating a desired directory extension;
   generating an aggregatable software object to implement the desired directory extension using a predetermined software object framework having a class identification and one or more interfaces, each interface having an interface identification;
   inputting the generated aggregatable software object;
   associating one of a directory class and a directory attribute to the class identification of the aggregatable software object, as stored in a first server location comprising a directory of the one of a directory class and a directory attribute;
   replicating the association stored in the first server location to a second server location;
   querying the one of the directory class and the directory attribute to expose the one or more interfaces of the aggregatable software object; and
   creating an instance of the aggregatable software object upon querying the one of the directory class and the directory attribute.

2. The method of claim 1, further comprising invoking one of the one or more interfaces of the aggregatable software object via the interface identification of the one or more interfaces.

3. The method of claim 2, further comprising creating an instance of the aggregatable software object upon invoking the one of the one or more interfaces of the aggregatable software object.

4. The method of claim 1, wherein inputting an aggregatable software object comprises:
   creating the aggregatable software object, including assigning the class identification to the aggregatable software object; and,
   creating and implementing the one or more interfaces of the aggregatable software object; including assigning the interface identification for each interface.

5. The method of claim 1, where the predetermined software object framework comprises the Component Object Model (COM) framework.

6. The method of claim 1, wherein the one of a directory class and a directory attribute is consistent with one of Lightweight Directory Access Protocol (LDAP), Novell Directory Services (NDS), and NT Directory Services.

7. The method of claim 1, wherein the one of a directory class and a directory attribute comprises a directory class.

8. The method of claim 1, wherein the one of a directory class and a directory attribute comprises a directory class attribute.

9. A machine-readable medium having instructions stored thereon for execution by a processor to perform a method comprising:
   generating a desired directory extension for a directory service, wherein the directory extension adds extended functionality to the directory service;
   generating an aggregatable software object to implement the desired directory extension using a predetermined directory framework having a class identification and one or more interfaces, each interface having an interface identification;
   inputting the generated aggregatable software object;
   associating one of a directory class and a directory attribute to the class identification of the aggregatable software object, as stored in a first server location comprising a directory of the one of a directory class and a directory attribute;
   replicating the association stored in the first server location to a second server location;
   querying the one of the directory class and the directory attribute to expose the one or more interfaces of the aggregatable software object; and
   creating an instance of the aggregatable software object upon querying the one of the directory class and the directory attribute.

10. The medium of claim 9, further comprising invoking one of the one or more interfaces of the aggregatable software object via the interface identification of the one or more interfaces.

11. The medium of claim 10, further comprising creating an instance of the aggregatable software object upon invoking the one of the one or more interfaces of the aggregatable software object.

12. The medium of claim 9, wherein inputting an aggregatable software object comprises:
   creating the aggregatable software object, including assigning the class identification to the aggregatable software object; and,
   creating and implementing the one or more interfaces of the aggregatable software object, including assigning the interface for each interface.

* * * * *